United States Patent
Haas et al.

(10) Patent No.: US 10,499,657 B2
(45) Date of Patent: Dec. 10, 2019

(54) BAKING APPARATUS

(71) Applicant: HAAS FOOD EQUIPMENT GMBH, Vienna (AT)

(72) Inventors: Johannes Haas, Vienna (AT); Josef Haas, Leobendorf (AT); Stefan Jiraschek, Koenigsbrunn (AT); Ralf Dolezel, Vienna (AT)

( * ) Notice: Subject to any disclaimer, the term of this patent is extended or adjusted under 35 U.S.C. 154(b) by 731 days.

(21) Appl. No.: 14/916,337

(22) PCT Filed: Aug. 26, 2014

(86) PCT No.: PCT/EP2014/068030
§ 371 (c)(1),
(2) Date: Mar. 3, 2016

(87) PCT Pub. No.: WO2015/032649
PCT Pub. Date: Mar. 12, 2015

(65) Prior Publication Data
US 2016/0192663 A1 Jul. 7, 2016

(30) Foreign Application Priority Data

Sep. 3, 2013 (AU) .................................. A 684/2013

(51) Int. Cl.
*A21B 1/48* (2006.01)
*A21B 5/02* (2006.01)
(52) U.S. Cl.
CPC .. *A21B 1/48* (2013.01); *A21B 5/02* (2013.01)
(58) Field of Classification Search
CPC .... A21B 1/48; A21B 5/02; A21B 5/03; A23L 1/00; A47J 37/00

(Continued)

(56) References Cited

U.S. PATENT DOCUMENTS 5,575,083 A * 11/1996 Lee .................. F26B 5/048
34/255
5,988,047 A * 11/1999 Haas .................. A21B 5/03
99/353

(Continued)

FOREIGN PATENT DOCUMENTS

AT 411955 B 8/2004
AT 413177 B 12/2005

(Continued)

OTHER PUBLICATIONS

Wikipedia, "Caster".

*Primary Examiner* — Dana Ross
*Assistant Examiner* — Joseph W Iskra
(74) *Attorney, Agent, or Firm* — Laurence A. Greenberg; Werner H. Stemer; Ralph E. Locher

(57) ABSTRACT

A baking apparatus produces endless strips of preferably liquid baking compounds on a baking surface carrier circulating in a machine frame, being heated at least in sections and transporting at least one endless baking surface through at least one baking zone disposed in a stationary manner in the machine frame. The baking zone contains a heating apparatus and extends from a baking compound application device as far as a strip removal apparatus. A rotatably mounted and driven hubless drum is provided as the circulating heated baking surface carrier. A follower roller is disposed pivotably about a steering axle and rolls on a rolling surface of the drum in a contact region. A tracking distance is provided between a point of intersection of the steering axle with the rolling surface and the contact region.

17 Claims, 4 Drawing Sheets

(58) Field of Classification Search
USPC ... 99/353–355, 372–379, 386, 450.1, 443 R,
99/427, 443 C, 476–479; 126/21 A, 149;
198/432, 459.5; 219/388, 400;
432/112–114
See application file for complete search history.

(56) References Cited

U.S. PATENT DOCUMENTS

| | | | | |
|---|---|---|---|---|
| 6,575,083 | B2 * | 6/2003 | Haas | A21B 5/03 99/353 |
| 9,010,239 | B2 | 4/2015 | Haas et al. | |
| 2002/0155803 | A1 | 10/2002 | Tieleman | |

FOREIGN PATENT DOCUMENTS

| | | |
|---|---|---|
| CN | 2031202 U | 1/1989 |
| CN | 2055323 U | 4/1990 |
| CN | 104430677 A | 3/2015 |
| EA | 1996 B1 | 10/2001 |
| RU | 121996 U1 | 11/2012 |
| WO | 9734492 A1 | 9/1997 |
| WO | 0065918 A1 | 11/2000 |

* cited by examiner

BAKING APPARATUS

BACKGROUND OF THE INVENTION

Field of the Invention

The invention relates to a baking apparatus for producing endless strips of preferably liquid baking compounds on a baking surface carrier circulating in a machine frame, which is heated at least in sections, which transports at least one endless baking surface through at least one baking zone disposed stationarily in the machine frame, which contains a heating apparatus and which extends from a baking compound application device as far as a strip removal apparatus, where a rotatably mounted and driven hub less drum is provided as a circulating heated baking surface carrier.

In particular, the invention relates to a baking apparatus comprising a rotatably mounted and driven drum which is guided in the machine frame.

Similar apparatuses are known and published in various embodiments.

For example, baking machines are known for the manufacture of rolled baked products such as wafers or wafer tubes in which a drum is rotated about a central axis. In this case, the drum is rotatably mounted in the region of the axis with a floating-fixed bearing arrangement in such a manner that a lateral movement is prevented. The baking surface carrier itself is designed to be wheel-shaped or cylindrical and has connecting elements which extend from its outer region as far as the wheel hub. This connection of the outer baking surface and the wheel hub has the disadvantage that no further elements such as, for example, heating elements or baking compound application device can be provided in the inside of the baking surface carrier.

For this reason, these baking machines have been further developed, where a hollow cylindrical ring is provided as baking surface carrier. This hub less arrangement usually has a drive roller in the lower region on which the baking ring rests. The baking rings for example have a diameter of approximately one to 2.5 metres and a width of about 20 cm to 60 cm.

When fabricating the baking rings, an exact plane-parallelism of the lateral faces as well as an exact concentricity of the round surfaces cannot be fabricated economically. As a result of the resulting manufacturing tolerances, baking rings tend to execute a lateral movement during endless rotation. In order to prevent this lateral movement of the baking ring, according to the prior art guide rollers with guide rims are used whose axes of rotation run substantially parallel to the axis of rotation of the baking ring. A disadvantage with this construction is that severe wear occurs between the rims and the baking ring. As a result of the relatively large dimensions and the long down times, breakaway of the edges of the baking ring or fracture of the guide rim of the guide rollers occurs during this forced guidance.

BRIEF SUMMARY OF THE INVENTION

It is the object of the invention to provide a baking device of the aforesaid type in which the hub less drum is guided, where the guidance is executed simply, in a low-wear, low-maintenance and reliable manner.

In particular it is the object of the invention to provide a drive and guide apparatus for an aforesaid baking machine which is simple and effective in structure, where the maintenance costs and the efficiency of the baking machine is thereby improved.

The objects according to the invention are solved in particular by the features of the independent patent claims.

Further advantageous features of the baking apparatus for producing endless strips of preferably liquid baking compounds on a baking surface carrier circulating in a machine frame, which is heated at least in sections, which transports at least one endless baking surface through at least one baking zone disposed stationarily in the machine frame, which contains a heating apparatus and which extends from a baking compound application device as far as a strip removal apparatus, where a rotatably mounted and driven hub less drum is provided as a circulating heated baking surface carrier, are that a follower roller disposed pivotably about a steering axle is provided, which in a contact region rolls on a rolling surface of the drum, wherein a tracking distance is provided between the point of intersection of the steering axle with the rolling surface and the contact region, that the rolling surface is a lateral surface of the drum, that the rolling surface is an inner lateral surface of the drum, that the follower roller is mounted rotatably about a wheel axle on a tracking rod and/or that the tracking rod is mounted rotatably about the steering axle on the machine frame.

Advantageously the invention can be characterised in that the steering axle runs substantially orthogonal to the wheel axle, that the drum is supported against gravity on the follower roller, that the drum is disposed in a suspended manner on a drive roller for the rotational drive of the drum, that the drum is designed to be hollow-cylindrical and comprises an inner lateral surface and an outer lateral surface, that the drive roller and the follower roller roll on the inner lateral surface, that a baking surface is provided on the outer lateral surface and/or that during pivoting of the tracking rod from the neutral position, in particular through rotation of the drum, a restoring moment is generated in the direction of the neutral position, where in the neutral position the steering axle and the centre of gravity of the instantaneous contact region of the follower roller with the rolling surface lie in one plane, where the plane is a normal plane of the axis of rotation of the drum or the axis of rotation of the follower roller and the axis of rotation of the drive roller run parallel, that at least one guide roller is provided on both sides of the drum, that the guide rollers touch the drum at the faces thereof or are disposed in the region of the faces, that the guide rollers are provided in an angular region of 90° upstream and/or downstream of the drive roller and are preferably provided in the upper third of the drum suspended on the drive roller, that the drive roller abuts against the drum outside the upper turning point and is preferably provided in an angular region of 1° to 30° upstream or downstream of the upper turning point of the drum, that the drum geometrically comprises a first half and a second half, where the two halves are separated from one another by a vertically running plane comprising the axis of rotation of the drum and/or that the drive roller contacts the drum in the first half and the follower roller contacts the drum in the second half outside the plane.

The apparatus comprises a machine frame on which a baking surface carrier is provided. This is preferably designed as a hollow cylindrical body which can be heated or is heated by a stationarily disposed heating apparatus so that a baking zone is formed between a baking compound application device and a strip removal apparatus.

Preferably the baking surface carrier is disposed in a suspended manner on a drive roller and is rotationally driven by the drive roller.

Preferably the drive roller is provided in the upper region of the baking surface carrier. The baking surface carrier which is in particular designed to be annular has an upper dead point. The upper dead point corresponds to that dead point of the cylindrical body which corresponds to the highest point of the perpendicular drum. According to one embodiment of the invention, the drive roller is disposed in a region outside this upper dead point. In particular the drive roller contacts the baking surface carrier in an angular region of 1° to 90° upstream or downstream of the upper dead point.

In order to keep the baking surface carrier in this position against gravity, the follower roller according to the invention is provided. This is coupled to the machine frame and placed on the baking surface carrier. As a result, the baking surface carrier is supported against gravity on the follower roller.

The follower roller is mounted rotatably about a wheel axle and rolls on a rolling surface of the baking surface carrier. In particular, the follower roller is mounted rotatably on a tracking rod. The tracking rod is preferably mounted rotatably on a steering axle, where preferably the steering axle and the wheel axle have a non-zero normal distance from one another. The steering axle preferably lies in a normal plane of the axis of rotation of the drum.

The follower roller contacts the rolling surface of the baking surface carrier in a contact region. This contact region is that region in which contact is possible between the baking surface carrier and the follower roller within the limits of the kinematics. As a result of a pivoting of the follower roller, the contact region substantially corresponds to a three-dimensionally curved arcuate section. The follower roller has a stable position in a central region, i.e. in the neutral position.

In the neutral position, for example, the steering axle and the centre of gravity of the instantaneous contact region of the follower roller with the rolling surface lie in one plane, where the plane is a normal plane of the axis of rotation of the drum.

The axis of intersection of the steering axle with the rolling surface and the contact region have a certain tracking distance. By this means the follower roller is pressed into the neutral position by the rotation of the baking surface carrier. In particular a restoring moment into the neutral position is brought about by the rotation of the baking surface carrier. As a result, a guidance of the baking surface carrier or the drum is brought about by the self-centring.

Preferably the steering axle is substantially orthogonal to the axis of rotation of the follower roller. This means that the two axes of rotation are normal to one another. However this does not necessarily mean that the two axes have a point of intersection with one another. Preferably there is no point of intersection.

That surface of the baking surface carrier on which the follower roller rolls is designated as rolling surface. This can be a surface, for example a cylindrical surface. However, surfaces which are segmented, ribbed or similar in sections can also be provided as rolling surfaces.

A region of angles which are measured from the centre of the baking surface carrier in or contrary to the rotation of the baking surface carrier is defined as angular region.

Furthermore, guide rollers can be provided for lateral guidance of the drum. These are disposed in particular in the region of the drive roller and guide the drum in the upper region. The guide rollers are preferably disposed in such a manner that they roll laterally on the face of the drum for guidance. They are adapted to execute a supporting correction of the slight lateral straying of the ring caused by manufacturing tolerances.

Exact lateral guidance is made possible by the follower roller.

The invention is described further subsequently by reference to specific exemplary embodiments.

DESCRIPTION OF THE INVENTION

Figure 1:
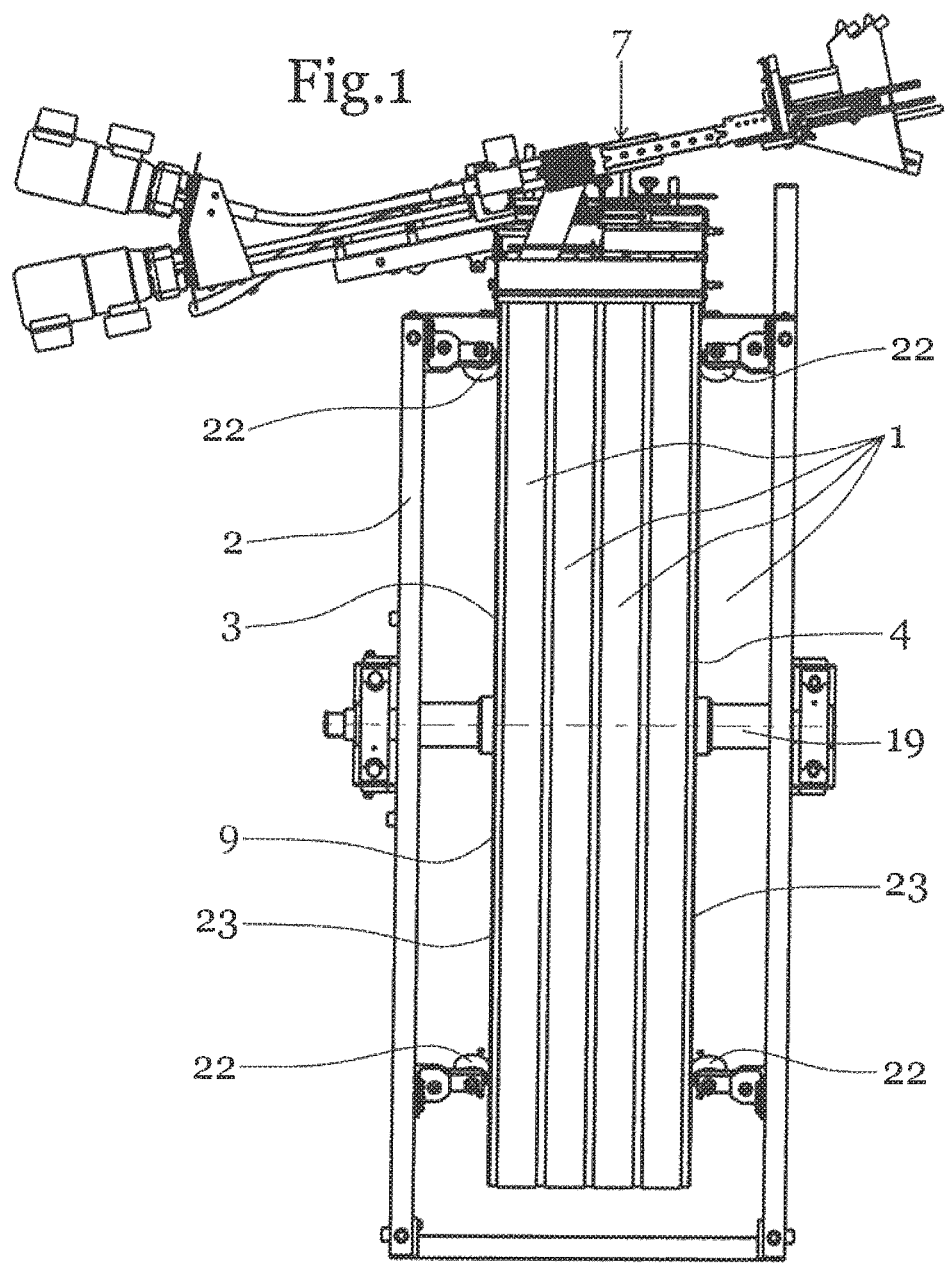
FIG. 1 shows a view of the baking apparatus from above.

FIG. 1 shows a baking apparatus according to the invention from above. It should be noted that this diagram is a schematic diagram. The apparatus comprises a machine frame 2, a baking surface carrier 3 with a baking surface 4, on which four strips 1 are baked. The baking surface carrier 3 is configured to be substantially cylindrical, where the axis of rotation of this cylinder runs substantially in the plane of the diagram in the view in FIG. 1. The baking compound application device 6 as well as the heating apparatus 5 are not indicated in the present schematic diagram. The strip removal apparatus 7 is adapted to remove the strips from the baking surface carrier 3 or the baking surface 4 and process them further. In particular, the dough strips 1 can be wound into elongated tubes.

The baking surface carrier 3 is designed as a drum 9 and in particular as a hub less drum in the present embodiment.

The drum 9 or the baking surface carrier 3 are disposed rotatably and driven. In the present embodiment the drive is accomplished via the drive roller 19 which touches the drum 9. The drive roller 19 is driven by a rotary drive not shown. Furthermore, guide rollers 22 are provided laterally on the face 23 of the drum 9. The guide rollers 22 are connected to the machine frame 2 and rotatably mounted. Between the rollers 22 each arranged in pairs, there is a free space which substantially corresponds to the width of the baking surface carrier or the drum 9. Optionally the lateral guidance of the drum 9 thus produced has a certain oversize so that the compressive forces and the wear between the face 23 of the drum 9 and the guide rollers 22 are kept small. Optionally the guide rollers 22 can also be spring-mounted. The axes of rotation of the guide rollers are substantially normal to the local curvature of the drum in the contact region. For example, the axes of rotation of the guide rollers 22 are disposed in the radial direction to the axis of rotation of the drum 9. The guide rollers 22 roll on the faces 23 of the drum 9.

The strip removal apparatus corresponds to a conventional strip removal apparatus.

Figure 2:
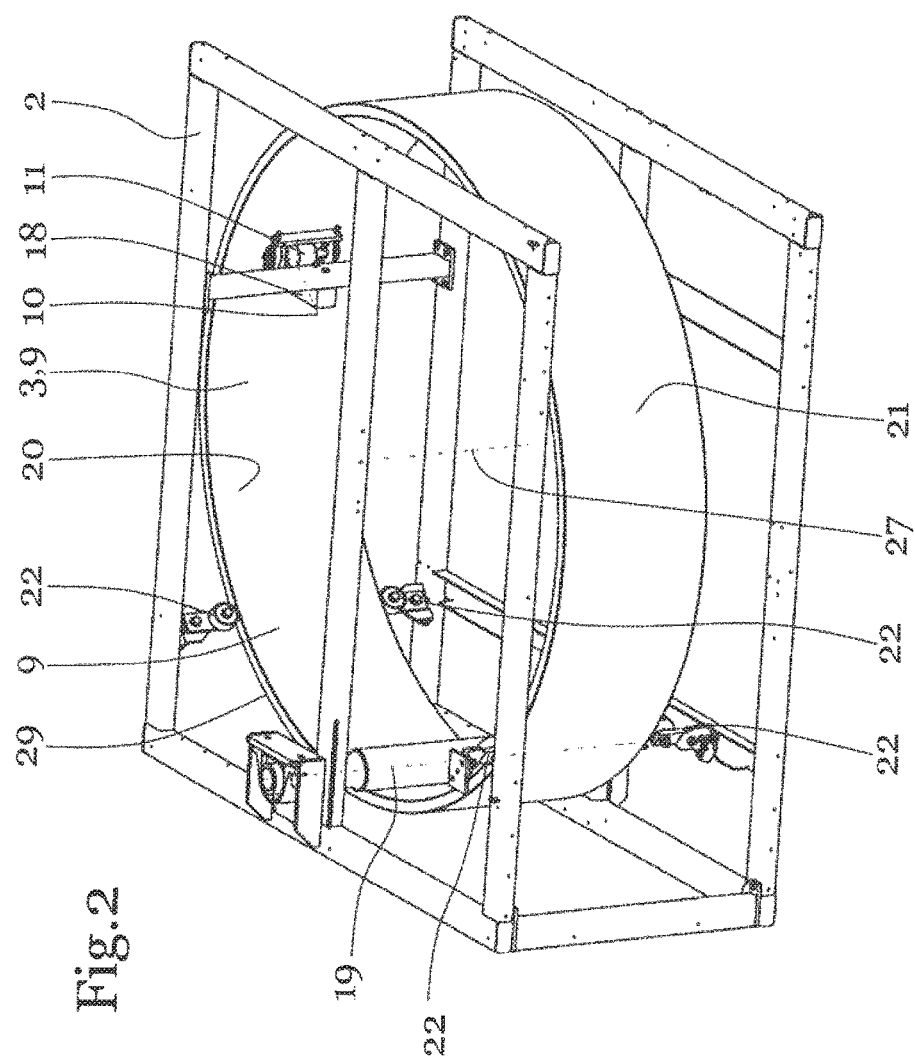
FIG. 2 shows an oblique view of the baking apparatus according to the invention.

FIG. 2 shows a schematic oblique view of the apparatus according to the invention. The view substantially corresponds to a view from obliquely below. The apparatus comprises a machine frame 2, a baking surface carrier 3 which is preferably designed as drum 9. In particular the drum 9 is designed to be hub less and/or annular. In the present embodiment the shape of the drum 9 substantially corresponds to a hollow cylinder. This has a cylindrical outer surface and a cylindrical inner surface. According to the invention, an inner lateral surface 20 and an outer lateral surface 21 are provided. The drive roller 19 is coupled rotatably and drivably to the machine frame 2. The drive roller 19 can be driven by means of a rotary drive. The drum 9 is provided suspended on the drive roller 19. The drive roller 19 contacts the drum 9 on the inner lateral surface 20. Furthermore, guide rollers 22 abutting against the faces 23 of the drum 9 are provided. In the schematic diagram in FIG. 2 lateral support elements of the machine frame 2 are omitted so that the apparatus is shown more clearly. In addition, the components strip removal apparatus 7, baking compound application device 6 and heating apparatus 5 are also omitted.

Furthermore a follower roller 11 is provided. This follower roller 11 rolls on the drum 9 in order in particular to effect a support of the drum. To this end, the follower roller 11 is provided on a tracking rod 18. The tracking rod 18 and/or the follower roller 11 are movably coupled to the machine frame 2. The drum has an axis of rotation 27 which is preferably disposed in a fixed position. However, the region of the axis of rotation 27 is substantially free from physical objects. As explained above, this preferably comprises a hub less drum 9.

Figure 3:
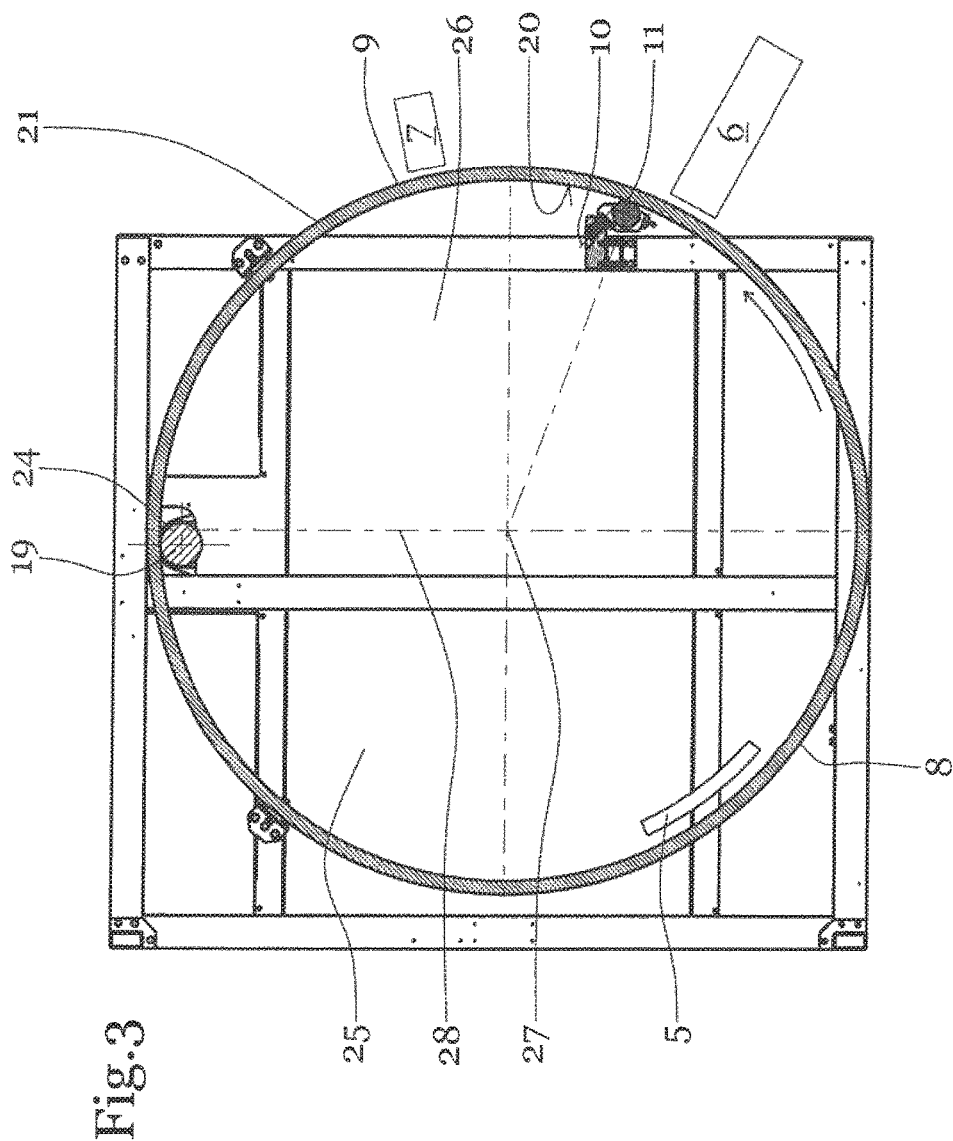
FIG. 3 shows a section of the baking apparatus according to the invention, where the axis of rotation of the baking surface carrier runs substantially projecting.

FIG. 3 shows a schematic sectional view of the apparatus according to the invention.

The components baking compound application device 6 and strip removal apparatus 7 are shown schematically. The baking compound application device 6 corresponds to a conventional baking compound application apparatus for annular baking machines. This is suitable and/or adapted to apply the baking compound in a strip shape to the heated baking surface carrier 3 or to the endless baking surface 4. In the diagram in FIG. 3 the direction of rotation of the baking surface carrier 3 or the drum 9 runs in the clockwise direction. This means that in the present configuration the baking zone 8 occupies a large portion of the circumference of the drum. It extends in particular along the direction of rotation of the drum 9 from the baking compound application device 6 as far as the strip removal apparatus 7. In the present diagram the strip removal apparatus 7 is shown schematically and corresponds to a conventional strip removal apparatus for annular baking machines.

FIG. 3 shows a possibility for positioning the baking compound application device 6 and the strip removal apparatus 7. However, in all embodiments of the invention these components can be provided at different positions. For example, a baking zone 8 can be provided on the inner side of the drum. Here it should be noted that the baking zone is disposed so that it does not overlap with those components which contact the drum on their inner side. However, the present configuration provides sufficient space between the components drive roller 19 and follower roller 11 in order to form a baking zone on the inner side of the drum.

Furthermore, according to another alternative embodiment, a plurality of baking mass application devices 6 can be provided adjacent to one another, so that a plurality of strips are baked adjacent to one another on a drum 9 and can be removed by one or more strip removal apparatuses 7.

Furthermore the heating apparatus 5 is shown schematically in FIG. 3. This also substantially corresponds to a conventional heating apparatus for annular baking machines. This can be designed, for example, as a gas heating apparatus or induction heating apparatus. In particular, the heating apparatus 5 can be provided in the inner side of the drum, on the outer side of the drum and/or laterally and extend over a small portion and a large portion of the circumference of the drum. Preferably the heating apparatus 5 is provided along the baking zone 8.

The drum 9 is provided suspended on the drive roller 19. For transmission of the rotation the drive roller 19 contacts the drum 9. The contact region between the drive roller 19 and the drum 9 is preferably located outside the upper turning point 24. This turning point 24 substantially corresponds to that region of the drum in which a horizontally running plane 28 containing the axis of rotation 27 of the baking surface carrier intersects the drum 9. This therefore comprises the highest point of the rolling surface of the drum 9. The horizontal plane 28 divides the drum 9 substantially in two halves. In the present diagram the first half 25 is disposed on the left of the plane 28. In the present diagram the second half 26 is disposed on the right of the plane 28. In the present embodiment the drive roller 19 contacts the drum 9 in the first half 25. Furthermore a follower roller 11 is provided. This follower roller 11 contacts the drum in the second half 26. As stated, the horizontal plane 28 runs substantially through the axis of rotation 27 of the drum 9 which in the present diagram runs in a substantially projecting manner.

As a result of the eccentric arrangement of the drive roller 19, the drum 9 is supported on the one hand on the drive roller 19 and on the other hand on the follower roller 11 against gravity. As a result of the eccentric offset, a force is brought about which automatically presses the drum 9 against the follower roller 11 due to the influence of gravity. An automatic centring of the drum 9 or the baking surface carrier 3 is brought about by the special configuration of the kinematics of the follower roller 11.

In the present embodiment the drive roller 19 and the follower roller 11 roll on the inner lateral surface 20 of the drum 9.

Optionally, the two components follower roller 11 and drive roller 19 can roll on different surfaces of the drum 9. For example, the drive roller and/or the follower roller can roll on the outer side or on the outer lateral surface 21.

Figure 4:
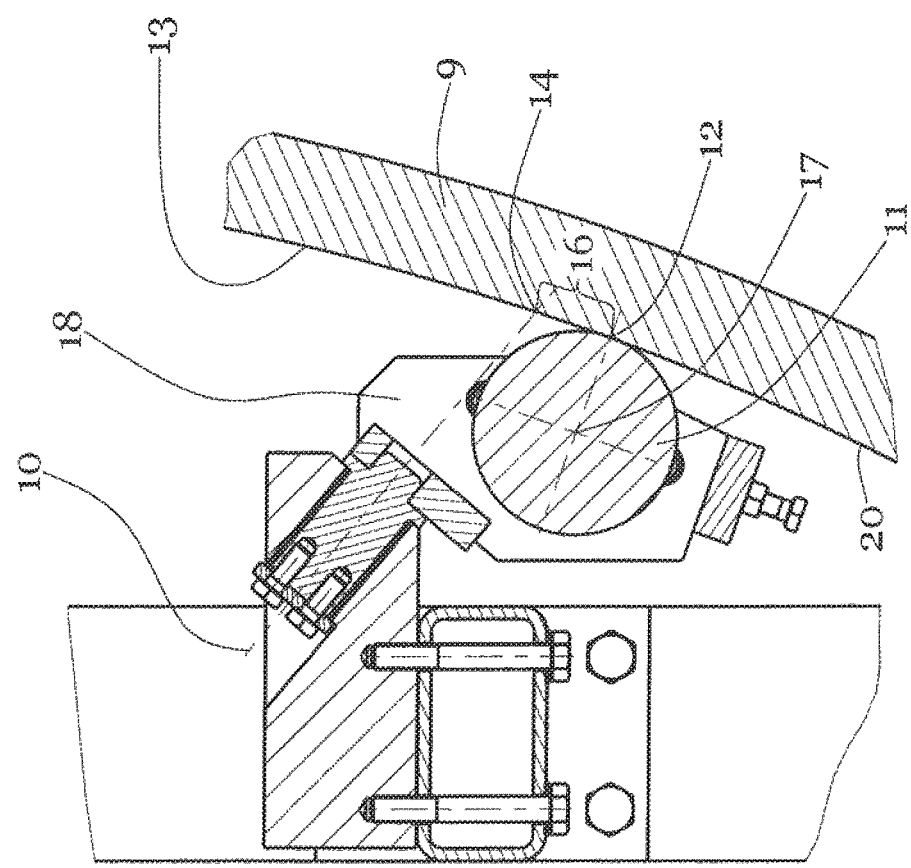
FIG. 4 shows a detail of the follower roller and the tracking rod in a schematic sectional view.

FIG. 4 shows a detail of the sectional view of FIG. 3, where in particular the region of the follower roller 11 is shown. The follower roller 11 rolls on the drum 9. In particular the follower roller 11 contacts the drum 9 and in particular the inner lateral surface 20 of the drum 9 in a contact region 12. The contact region 12 is that region in which the follower roller 11 contacts the drum 9. Due to the pivotability of the follower roller 11 this contact region 12, for example, has an arcuate profile. The follower roller 11 is disposed rotatably about a wheel axle 17, which runs in a substantially projecting manner in the present diagram, on the tracking rod 18. The tracking rod 18 is also disposed rotatably or pivotably. In particular the tracking rod 18 is disposed rotatably about the steering axle 10. The rolling surface 13 on which the follower roller 11 rolls and on which the contact region 12 is provided has a distance from the point of intersection of the steering axle 10 with the rolling surface 13. This distance is designated as tracking distance 16. Due to rotation of the drum 9 the follower roller is moved into a neutral position. This neutral position corresponds to a stable position of the tracking rod 18 or the follower roller 11. During lateral movement of the drum 9 the follower roller 11 is also moved, whereby the tracking rod 18 is twisted about the steering axle 10. The parallelism of the two axes—drive roller and follower roller—is produced again. This prevents tensions and high lateral running losses which would result in wear.

REFERENCE LIST

1 Strip
2 Machine frame
3 Baking surface carrier
4 Baking surface
5 Heating apparatus
6 Baking compound application device
7 Strip removal apparatus
8 Baking zone
9 Drum
10 Steering axle
11 Follower roller
12 Contact region
13 Rolling surface
14 Point of intersection
15 -
16 Tracking distance
17 Wheel axle
18 Tracking rod
19 Drive roller
20 Inner lateral surface
21 Outer lateral surface
22 Guide roller
23 Face
24 Turning point
25 First half
26 Second half
27 Axis of rotation of drum
28 Plane

The invention claimed is:

1. A baking apparatus for producing endless strips of solid or liquid baking compounds, the baking apparatus comprising:
a machine frame;
a baking compound application device;
a strip removal apparatus;
at least one baking zone disposed in a stationary manner in said machine frame, said at least one baking zone extending from said baking compound application device to said strip removal apparatus and containing a heating apparatus;
a rotatably mounted and driven hubless drum having a rolling surface and being provided as a circulating, heated baking surface carrier, said baking surface carrier carrying the strips, circulating in said machine frame, being heated at least in sections and transporting at least one endless baking surface through said at least one baking zone;
a swivel caster rolling on said rolling surface in a contact region, said swivel caster being disposed pivotably about a steering axle, whereby said steering axle intersects said rolling surface at a point of intersection; and
said point of intersection and said contact region defining a tracking distance therebetween.

2. The baking apparatus according to claim 1, wherein said rolling surface is a lateral surface of said drum.

3. The baking apparatus according to claim 1, wherein said rolling surface is an inner lateral surface of said drum.

4. The baking apparatus according to claim 1, wherein said swivel caster is rotatably mounted on a wheel axle on a tracking rod, and said tracking rod is mounted rotatably about said steering axle on said machine frame.

5. The baking apparatus according to claim 4, wherein said steering axle runs substantially orthogonally to said wheel axle.

6. The baking apparatus according to claim 1, wherein said drum is supported against gravity on said swivel caster.

7. The baking apparatus according to claim 1, which further comprises a drive roller for a rotary drive of said drum, said drum being disposed in a suspended manner on said drive roller.

8. The baking apparatus according to claim 7, wherein said drum is hollow cylindrical and has an inner lateral surface and an outer lateral surface, said drive roller and said swivel caster roll on said inner lateral surface and said baking surface is provided on said outer lateral surface.

9. The baking apparatus according to claim 4, wherein:
said drum has an axis of rotation;
said contact region of said swivel caster with said rolling surface is an instantaneous contact region with a center of gravity;
said tracking rod pivots from a neutral position;
during pivoting of said tracking rod a restoring moment is generated in direction of said neutral position; and
in said neutral position said steering axle and said center of gravity of said instantaneous contact region lie in one plane being a normal plane of said axis of rotation of said drum.

10. The baking apparatus according to claim 9, wherein said tracking rod pivots from said neutral position through a rotation of said drum.

11. The baking apparatus according to claim 1, which further comprises at least one guide roller provided on each respective side of said drum.

12. The baking apparatus according to claim 11, wherein said drum has faces, and said guide rollers contact said drum on said faces of said drum or said guide rollers are disposed in a vicinity of said faces of said drum.

13. The baking apparatus according to claim 11, which further comprises a drive roller for a rotary drive of said drum, said drum being disposed in a suspended manner on said drive roller, and said guide rollers being provided in an angular region of 90° at least one of upstream or downstream of said drive roller.

14. The baking apparatus according to claim 13, wherein said guide rollers are provided in an upper third of said drum suspended on said drive roller.

15. The baking apparatus according to claim 7, wherein said drum has an upper turning point and said drive roller abuts against said drum outside said upper turning point.

16. The baking apparatus according to claim 15, wherein said drive roller is provided in an angular region of 1° to 30° upstream or downstream of said upper turning point of said drum.

17. The baking apparatus according to claim 7, wherein:
said drum has an axis of rotation;
said drum geometrically includes a first half and a second half being separated from one another by a vertically running plane including said axis of rotation of said drum; and
said drive roller contacts said drum in said first half and said swivel caster contacts said drum in said second half outside said plane.

* * * * *